(12) United States Patent
Perfetti et al.

(10) Patent No.: US 9,766,104 B2
(45) Date of Patent: Sep. 19, 2017

(54) MAGNETO-INDUCTIVE FLOW-MEASURING SYSTEM

(71) Applicant: KROHNE AG, Basel (CH)

(72) Inventors: Christine Perfetti, Chatuzange le Goubet (FR); Juan Carlos Gonzalez-Pelayo, Metern (NL)

(73) Assignee: Krohne AG, Basel (CH)

( * ) Notice: Subject to any disclaimer, the term of this patent is extended or adjusted under 35 U.S.C. 154(b) by 0 days.

(21) Appl. No.: 15/030,151

(22) PCT Filed: Oct. 14, 2014

(86) PCT No.: PCT/EP2014/002769
§ 371 (c)(1),
(2) Date: Apr. 18, 2016

(87) PCT Pub. No.: WO2015/055303
PCT Pub. Date: Apr. 23, 2015

(65) Prior Publication Data
US 2016/0258794 A1 Sep. 8, 2016

(30) Foreign Application Priority Data

Oct. 17, 2013 (DE) .................. 10 2013 017 286
Nov. 15, 2013 (DE) .................. 10 2013 019 067

(51) Int. Cl.
*G01F 1/58* (2006.01)
*G01F 25/00* (2006.01)
(Continued)

(52) U.S. Cl.
CPC .............. *G01F 1/584* (2013.01); *G01F 1/60* (2013.01); *G01F 15/14* (2013.01); *G01F 25/0007* (2013.01)

(58) Field of Classification Search
CPC ..................................... G01F 1/58; G01F 1/56
(Continued)

(56) References Cited

U.S. PATENT DOCUMENTS 4,195,515 A  4/1980  Smoll
4,881,413 A  11/1989  Georgi et al.
(Continued)

FOREIGN PATENT DOCUMENTS

DE    692 32 633 T2    9/2002
EP     0 704 682 A2    4/1996
(Continued)

Primary Examiner — Jewel V Thompson
(74) Attorney, Agent, or Firm — David S. Safran (57) ABSTRACT

A magnetic-inductive flow-through measurement system, having a measuring tube for an electrically conductive medium, a magnetic field generating device for generating a magnetic field running at least perpendicular to the longitudinal axis of the measuring tube, at least two measuring electrodes which tap the measurement voltage induced in the electrically conductive medium, and an evaluation unit, wherein the measuring electrodes have measuring contact which are accessible externally on the measuring tube, and the measuring tube together with the measuring electrodes form a first functional unit, and counter-contacts corresponding to the measuring contacts, the magnetic field generating device and the evaluation unit form a second functional unit in a measurement system housing. The measuring electrodes and the corresponding counter-contacts corresponding are arranged in such a way, that the measuring contacts can be brought into electrically conductive contact with the counter-contacts by a movement running substantially perpendicular to the magnetic field direction.

14 Claims, 4 Drawing Sheets (51) Int. Cl.
   *G01F 1/60* (2006.01)
   *G01F 15/14* (2006.01)
(58) Field of Classification Search
   USPC .......................... 73/861.12, 861.15, 861.08
   See application file for complete search history.

(56) References Cited

U.S. PATENT DOCUMENTS

| | | | | |
|---|---|---|---|---|
| 5,220,841 A | * | 6/1993 | Brown | A61B 5/0265 600/504 |
| 5,417,119 A | | 5/1995 | Smoll | |
| 5,450,758 A | * | 9/1995 | Smoll | A61B 5/0265 600/504 |
| 6,092,428 A | | 7/2000 | Brockhaus | |
| 6,260,420 B1 | * | 7/2001 | Ketelsen | G01F 1/584 73/861.12 |
| 6,272,751 B1 | * | 8/2001 | McMeekin | F16C 17/026 29/898.054 |
| 6,453,754 B1 | | 9/2002 | Florin | |
| 6,564,612 B2 | | 5/2003 | Brockhaus | |
| 6,804,613 B2 | | 10/2004 | Ishikawa et al. | |
| 7,971,493 B2 | | 7/2011 | Hencken et al. | |
| 9,285,253 B2 | | 3/2016 | Brockhaus | |
| 2007/0220992 A1 | * | 9/2007 | Lam | G01F 1/58 73/861.15 |
| 2012/0066301 A1 | | 3/2012 | Holland | |
| 2015/0316399 A1 | * | 11/2015 | Graf | G01F 1/588 73/861.12 |
| 2016/0202097 A1 | * | 7/2016 | Beerling | G01F 1/584 73/861.12 |

FOREIGN PATENT DOCUMENTS

| | | |
|---|---|---|
| JP | H 05-23394 A | 2/1993 |
| JP | 2007-071695 A | 3/2007 |

\* cited by examiner

MAGNETO-INDUCTIVE FLOW-MEASURING SYSTEM

BACKGROUND OF THE INVENTION

Field of the Invention

The invention relates to a magneto-inductive flow-measuring system having a measuring tube for the flow of an electrically conductive medium and having a magnetic field generator for generating a, preferably alternating, magnetic field running at least also perpendicular to the longitudinal axis of the measuring tube, having at least two measuring electrodes tapping the measuring voltage induced in the electrically conductive medium, preferably in contact with the medium and preferably having an evaluation unit, wherein the measuring electrodes have accessible measuring contacts on the outside of the measuring tube and the measuring tube with the measuring electrodes forming a first functional unit and counter contacts corresponding to the measuring contacts of the measuring electrodes, the magnetic field generator and the evaluation unit (insofar such is present) forming a second functional unit and wherein the counter contacts, the magnetic field generator and the evaluation unit (insofar such is present) are provided in a measuring system housing.

Description of Related Art

Magneto-inductive flow-measuring systems have been known extensively for decades in the prior art. Reference is made, as an example, to the citation "Technische Durchflussmessung" from Dr.-Ing. K. W. Bonfig, $3^{rd}$ Edition, Vulkan-Verlag Essen, 2002, pages 123 to 167 and to the citation "Grundlagen Magnetisch-Induktive Durchflussmessung" from Dipl.-Ing. Friedrich Hoffmann, $3^{rd}$ Edition, 2003, publication of the company KROHNE Messtechnik GmbH & Co. KG.

The principle of a magneto-inductive flow-measuring system for flow measurement of a flowing medium goes back to Faraday, who, in 1832, suggested using the principle of electromagnetic induction in the measurement of flow rates of an electrically conductive medium.

According to Faraday's law of induction, an electrical field intensity develops perpendicular to the direction of flow of the medium in a flowing, electrically conductive medium interfused by a magnetic field and perpendicular to the magnetic field. Faraday's law of induction is utilized in magneto-inductive flow-measuring systems in that a temporally-alternating magnetic field is usually generated during measurement by means of a magnetic field generator, which usually has at least one magnetic field coil and the magnetic field at least partially interfuses the electrically conductive medium flowing through the measuring tube. Thereby, the generated magnetic field has at least one component perpendicular to the longitudinal axis of the measuring tube or perpendicular to the direction of flow of the medium.

As stated above, the at least one magnetic field generator "for generating a magnetic field running at least also perpendicular to the longitudinal axis of the measuring tube" belongs to the magneto-inductive flow-measuring system, then it should be indicated here that the magnetic field is namely preferable perpendicular to the longitudinal axis of the measuring tube or perpendicular to the direction of flow of the medium, but it is sufficient that one component of the magnetic field runs perpendicular to the longitudinal axis of the measuring tube or perpendicular to the direction of flow of the medium.

In the introduction, it is also stated that the magnetic field generator is intended for generating a, preferably alternating, magnetic field. This expresses that it is not important for the teaching of the invention—in respect to its origin, to its objects and to meeting these objects—that it is an alternating magnetic field, even when magneto-inductive flow-measuring systems predominately have magnetic field generators that generate an alternating magnetic field.

It is also mentioned in the introduction that at least two measuring electrodes, preferably in contact with the medium, tapping the measuring voltage induced in the electrically conductive medium belong to the magneto-inductive flow-measuring systems of the type being discussed here. Preferably, the virtual connection line of the two measuring electrodes runs at least essentially perpendicular to the direction of the measuring tube perpendicular to the longitudinal axis of the magnetic field interfusing the measuring tube. In particular, the measuring electrodes can be provided in such a manner that their virtual connection line actually—more or less—runs perpendicular to the longitudinal axis of the magnetic field interfusing the measuring tube.

Finally, it is described in the introduction that the measuring electrodes are such that they can be in contact with the medium. Effectively, of course, the electrical field intensity generated by induction in flowing, electrically conductive medium can be tapped by measuring electrodes that are in direct, i.e., galvanic, contact to the medium as a measuring voltage. However, there are magneto-inductive flow-measuring systems, in which the measuring voltage is not tapped by measuring electrodes that have direct, i.e., galvanic, contact to the medium, but rather the measuring voltage is capacitively determined.

Two different designs of magneto-inductive flow-measuring systems are possible, namely a first design, in which both functional units, i.e., the measuring tube on the one hand and the magnetic field generator on the other hand, are separate components that result in a functional magneto-inductive flow-measuring system when first brought together and a second design, in which the two functional units, i.e., the measuring tube and the magnetic field generator are already brought together in-factory, i.e., components made functional in-factory to result in an already functional magneto-inductive flow-measuring system from the factory.

In the following, only the first design of a magneto-inductive flow-measuring system is described, i.e., the design in which the measuring tube, on the one hand, and the magnetic field generator, on the other hand, are initially separate components that result in a functional magneto-inductive flow-measuring system when they are brought into function with one another. What is described in the following, however, is easily applicable for the second design of magneto-inductive flow-measuring systems, in which both functional units, the measuring tube and the magnetic field generator, are already brought into function with one another in-factory, i.e., components of an already functional magneto-inductive flow-measuring system from the factory.

As an example, reference is made to known magneto-inductive flowmeters from the prior art in DE 692 32 633 C2, DE 199 07 864 A1 corresponds to U.S. Pat. No. 6,453,754 B1, DE 100 64 738 B4 corresponds to U.S. Pat. No. 6,564,612 B2, DE 102 43 748 A1 corresponds to U.S. Pat. No. 6,804,613 B2, DE 10 2008 005 258 A1 corresponds to U.S. Pat. No. 7,971,493 B2 and DE 10 2011 112 703 A1 corresponds to U.S. Patent Application Publication 2012/0066301 A1 as well as EP 0 704 682 A1 and EP 0 834 057 A1 corresponds to U.S. Pat. No. 6,092,428.

Normally, a magnetic field coil belongs to the magnetic field generator in magneto-inductive flow-measuring systems of the type being discussed here. As a rule, this magnetic field coil has a coil core and two pole shoes are adjacent to the coil core on both sides. The coil core and the pole shoes usually consist of magnetic, conductive material, i.e., of material having a large permeability, and the pole shoes extend beyond the measuring tube on both sides. Thus, the coil core, the poles shoes adjacent to both sides of the coil core and the air gap formed between the pole shoes, in which the measuring tube is located, in the functional state, belong to the magnetic circuit, which is important and necessary for the functioning of the magneto-inductive flow-measuring system being discussed here.

As described in detail, the longitudinal axis of the measuring tube, the direction of the magnetic field and the virtual connection line of the two measuring electrodes for a right-angled tripod. If the longitudinal axis is the X-axis, the direction of the magnetic field the Y-axis, then the virtual connection line of the two measuring electrodes is the Z-axis of the right-angled tripod; the virtual connection line of the two measuring electrodes thus runs perpendicular to the longitudinal axis of the measuring tube as well as perpendicular to the direction of the magnetic field.

A problem results, which is described above, in that one measuring electrode with its measuring contact (and corresponding counter contact) is located on one side of the measuring tube and the other measuring electrode with its measuring contact (and corresponding counter contact) is located on the other side of the measuring tube. This has constructional as well as connectivity-related disadvantages and the elimination of these disadvantages is the object of this invention.

SUMMARY OF THE INVENTION

The magneto-inductive flow-measuring system according to the invention in which the above derived and described object is met is initially and essentially characterized in that the measuring contacts of the measuring electrodes are provided on the measuring tube in such a manner and the counter contacts corresponding to the measuring contacts of the measuring electrodes are arranged in the measuring system in such a manner that the measuring contacts can be brought into electrical contact with the counter contacts by means of an essentially translational movement essentially perpendicular to the direction of the magnetic field. This teaching according to the invention is advantageous for the first design described above of the magneto-inductive flow-measuring system, in which the measuring tube, on the one hand, and the magnetic field generator, on the other hand, are initially separate components that first result in a functional magneto-inductive flow-measuring system when they are brought into function with one another as well as advantageous for the second design, in which the measuring tube, on the one hand, and the magnetic field generator, on the other hand, are components of an already functional magneto-inductive flow-measuring system from the factory. In both cases, it is implemented, in particular, that each of the two measuring contacts of the measuring tube, which have to be initially provided for function, on the one hand, on one side of the measuring tube and, on the other hand, on the other side of the measuring tube, are easily reachable from one side by the corresponding counter contact or can be brought into electro-conductive contact with the corresponding counter contact.

In detail, there are various possibilities for designing and further developing the described first teaching of the invention.

A first preferred design of the magneto-inductive flow-measuring system according to the invention is characterized in that the measuring contact of the measuring electrode provided on the side of the measuring tube facing away from magnetic field coil is extended at least on one side, parallel to the direction of the magnetic field and the counter contact assigned to the measuring contact described above is extended until it comes into contact with the corresponding measuring contact. Thus, in this design, the counter contact that has to come into electro-conductive contact with the measuring contact, which is provided on the side of the measuring tube facing away from the magnetic coil, either has to practically reach over or under the entire diameter of the measuring tube. It is also possible to provide the measuring contact of the measuring electrode on the side of the measuring tube facing away from the magnetic field coil in the bottom area of the measuring tube.

Another preferred design of the magneto-inductive flow-measuring system according to the invention is characterized in that the measuring contact of the measuring electrode provided on the side of the measuring tube facing away from the magnetic field coil is extended at least on one side in the peripheral direction of the measuring tube and the counter contact assigned to the measuring contact described above is extended until it comes into contact with the corresponding measuring contact. In this design, the measuring contact of the measuring electrode provided on the side facing away from the magnetic coil is designed as a circular arc. Thereby, the circular arc-shaped measuring contact can encompass somewhat less than 180°, namely so much less that is does not come into contact with the measuring contact of the other measuring electrode.

What was described above for the measuring contact of the measuring electrode provided on the side of the measuring tube facing away from the magnetic coil, naturally also relates only to the measuring contact of the measuring electrode provided outside of the measuring tube. Within the measuring tube, the measuring electrode, whose outer measuring contact is designed in a particular manner, as is the other measuring electrode, is designed according to the extensive prior art.

In magneto-inductive flow-measuring systems, the measuring tube often has at least one circular ground electrode. If such a ground electrode is provided, then the teaching of the invention can also be implemented in that the ground electrode forms one of the two measuring electrodes and is designed in such a manner as is described above in detail.

According to a further teaching of the invention, which is of particular importance in conjunction with the above-described teaching of the invention, but also disassociated therefrom, it is provided in a magneto-inductive flow-measuring system of the type being discussed here, that each of the two counter contacts is assigned a test contact and that the two test contacts, on the one hand, and the two measuring contacts, on the other hand, are designed and arranged in such a manner that the test contacts have electro-conductive contact to the assigned counter contacts when and only when the counter contact also has electro-conductive contact to the assigned measuring contacts. Preferably, thereby, each of the two test contacts is assigned a test counter contact galvanically connected to the assigned measuring contact. This can be implemented in a simple manner in that each of the two test counter contacts and the assigned measuring contact are integrally formed, i.e., as one piece.

In a preferred design of the last-described magneto-inductive flow-measuring system, at least one test voltage source and at least one contact indicator, for example a light diode, are provided and the test voltage source, the test contacts, the test counter contacts, the assigned measuring contacts, the assigned counter contacts and the contact indicator form a test circuit. Thereby, the contact indicator is only active, i.e., a light diode provided as contact indicator is only lit, when the test circuit is closed, when, in particular, the counter contacts have electro-conductive contact with the assigned measuring contacts.

It is easily possible to provide only one test circuit, i.e., a test circuit that actively tests if each of the two counter contacts is in electro-conductive contact with each of the two assigned measuring contacts. Then, in the test circuit, the contact positions to be tested have to form a series connection. However, it is advantageous not only to provide one test circuit, but to provide two test circuits, so that it can be recognized using both provided contact indicators if a counter contact does not have electro-conductive contact with the assigned measuring contact, namely, which counter contact does not have electro-conductive contact with the assigned measuring contact, or if both counter contacts do not have electro-conductive contact with the assigned measuring contacts.

It is not unusual that magneto-inductive flow-measuring systems of the type being discussed here are required for measuring tubes with differing flow cross-sections, i.e., having differing inner diameters. Having to use different magneto-inductive flow-measuring systems for this is not desired for the implemented use or by the user. Thus, a further teaching of the invention, which is of particular importance in conjunction with the above-described teaching of the invention, but also disassociated therefrom, is based on measuring tubes having differing flow cross-sections, i.e., differing inner diameters being readily insertable or being able to be inserted.

Measuring tubes having differing flow cross-sections, i.e., with differing inner diameters, can be easily used when the differing measuring tubes each have the same outer diameter and the same measuring contacts, i.e., are only different in respect to the flow cross-section, which means in respect to the inner diameter.

The above-described implementation of easily insertable measuring tube having different flow cross-sections, i.e., with differing diameters, can be a problem in terms of manufacture. Consequently, another implementation of easily insertable measuring tubes with differing flow cross-sections, i.e., with differing inner diameters, is characterized in that the differing insertable or inserted measuring tubes each have the same or equivalent measuring contacts. Thus, it is sufficient when the measuring tubes, regardless of flow cross-section, i.e., independent of the inner diameter, are the same or at least functionally the same there, where the measuring contacts are brought into electrically conductive contact with the corresponding counter contacts.

If measuring tubes with differing flow cross-sections are used, i.e., with differing inner diameters, the user can take this into consideration. He can enter the flow cross-section, i.e., the inner diameter of the insertable or inserted measuring tube, into the evaluation unit, which can be a part of a magneto-inductive flow-measuring system according to the invention, but can also be implemented separate from a magneto-inductive flow-measuring system according to the invention. However, a particularly preferred design of a magneto-inductive flow-measuring system according to the invention, in which measuring tubes with different flow cross-sections, i.e., differing inner diameters, can be easily inserted, is characterized in that each measuring tube is provided with an inner diameter revealing member and inner diameter query member assigned to the inner diameter revealing member of the measuring tube in the measuring system housing. In this preferred design, thus, the effective flow cross-section, i.e., the effective inner diameter is automatically taken into consideration for flow measurement with the insertion of the correspondingly equipped measuring tube.

For magneto-inductive flow-measuring systems according to the invention, measuring tubes with differing flow cross-sections, i.e., with differing inner diameters, which are or can be easily inserted, in particular those that have the same outer diameter and same measuring contacts, in particular when they are provided with an inner diameter revealing member, are means that relate to an essential element of the invention described as yet.

Magneto-inductive flow-measuring systems, namely magneto-inductive flowmeters, i.e., magneto-inductive flow-measuring systems in which the two functional units, i.e., the measuring tube and the magnetic field generator are already brought into function with one another in-factory, i.e., components already brought into function with one another in-factory of a already functional magneto-inductive flowmeter, are normally calibrated in-factory. This is practically not possible for magneto-inductive flow-measuring systems, in which both functional units, i.e., the measuring tube, on the one hand, and the magnetic field generator, on the other hand, are separate components that first result in a functional magneto-inductive flow-measuring system when they are brought together in function. Consequently, a further teaching of the invention, which is of particular importance in conjunction with the above-described teachings of the invention, but also disassociated therefrom, is characterized in that a general in-factory calibration is sufficient, i.e., an application-specific calibration for the use of measuring tubes with different flow cross-sections, i.e., with different inner diameters, is not necessary. In order for this to be achieved, different measures are required or necessary.

A preferred design of the last-described magneto-inductive flow-measuring system is characterized in that the magnetic field generator generates a homogenous magnetic field sufficient for all insertable measuring tubes. This can be implemented in detail in a magneto-inductive flow-measuring system, in which at least one magnetic coil with a coil core and two pole shoes adjacent to both sides of the coil core belong to the magnetic field generator, in that the pole shoes extend beyond the inserted measuring tube on both sides. Specifically, the approach is to have the pole shoes extending beyond the inserted measuring tube at a measure that corresponds to the outer diameter of the measuring tube with the largest outer diameter.

Since a general in-factory calibration is sufficient, i.e., an application-specific calibration for the use of measuring tubes with different flow cross-sections, i.e., with different inner diameters, is not necessary, it is important to maintain certain tolerances. On the one hand, only measuring tubes whose percentage diameter tolerance is less than half the desired percentage accuracy should be or are inserted. On the other hand, measuring tubes with a percentage position tolerance corresponding to one quarter of the desired percentage accuracy can be attached or should be attached in the measuring system housing. In order to ensure the position tolerance, it is recommended to provide the measuring tube, on the one hand, and the measuring system housing, on the other hand, with horizontal and/or vertical attachment elements.

As described, there are various possibilities for designing and further developing the magneto-inductive flow-measuring system according to the invention as will become apparent from the following description of embodiments in conjunction with the accompanying drawings.

DETAILED DESCRIPTION OF THE INVENTION

Figure 1:
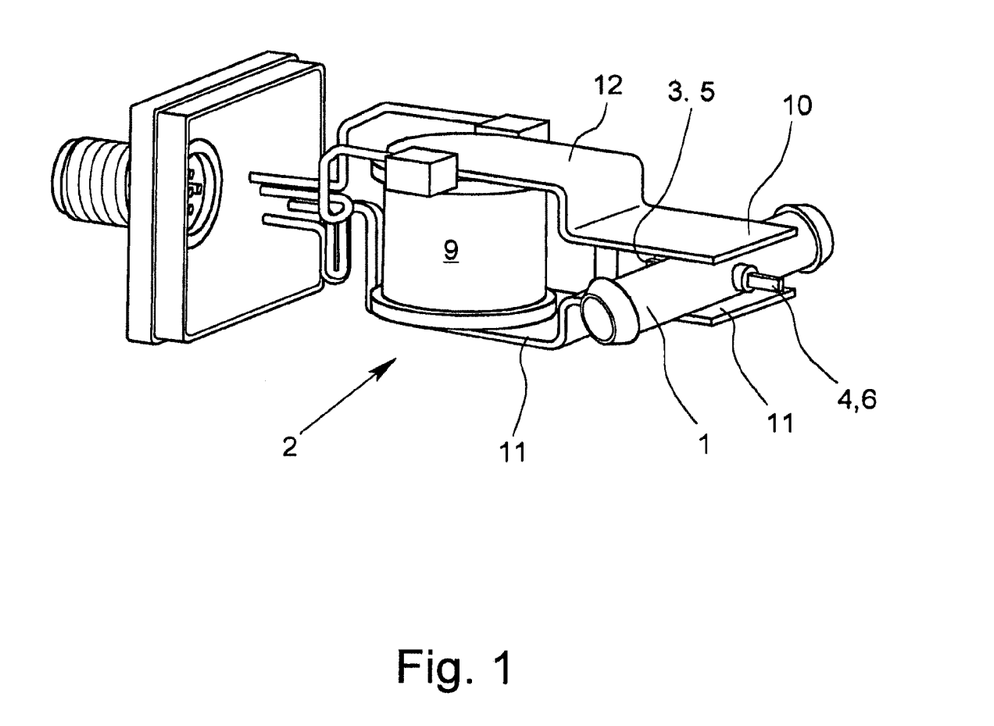
FIG. 1 shows a relatively schematic, basic construction of a magneto-inductive flow-measuring system.
Figure 4:
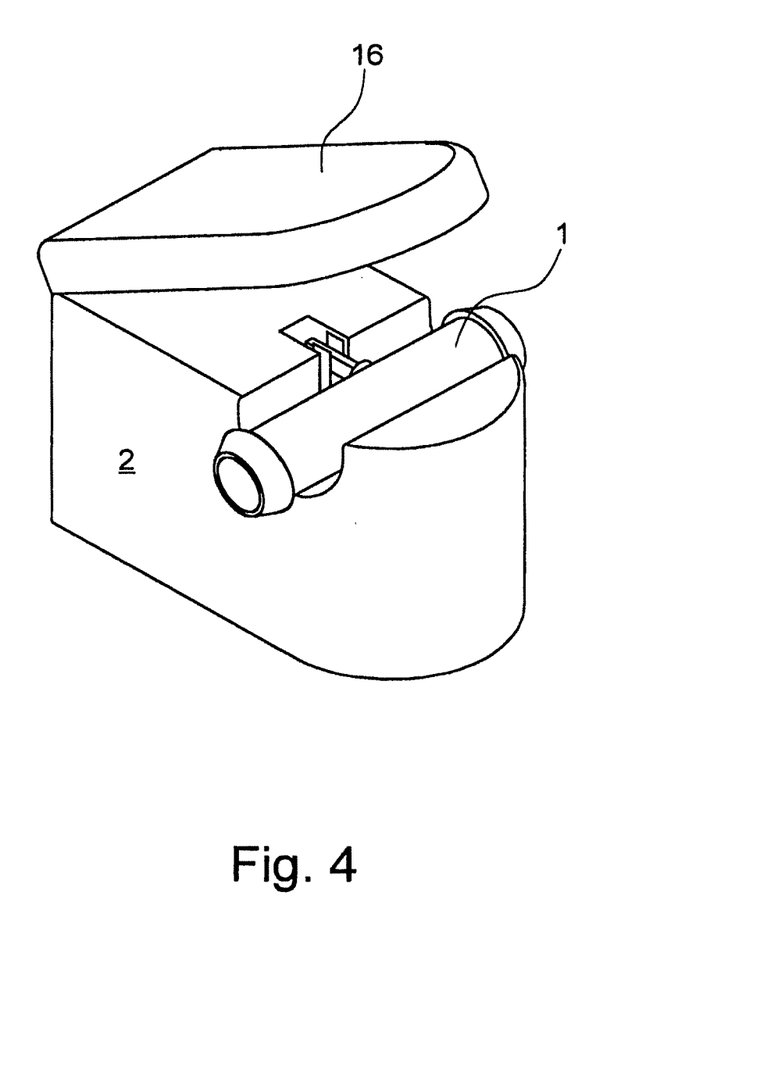
FIG. 4 is a very schematic, possible embodiment of a magneto-inductive flow-measuring system according to the invention
Figure 5:
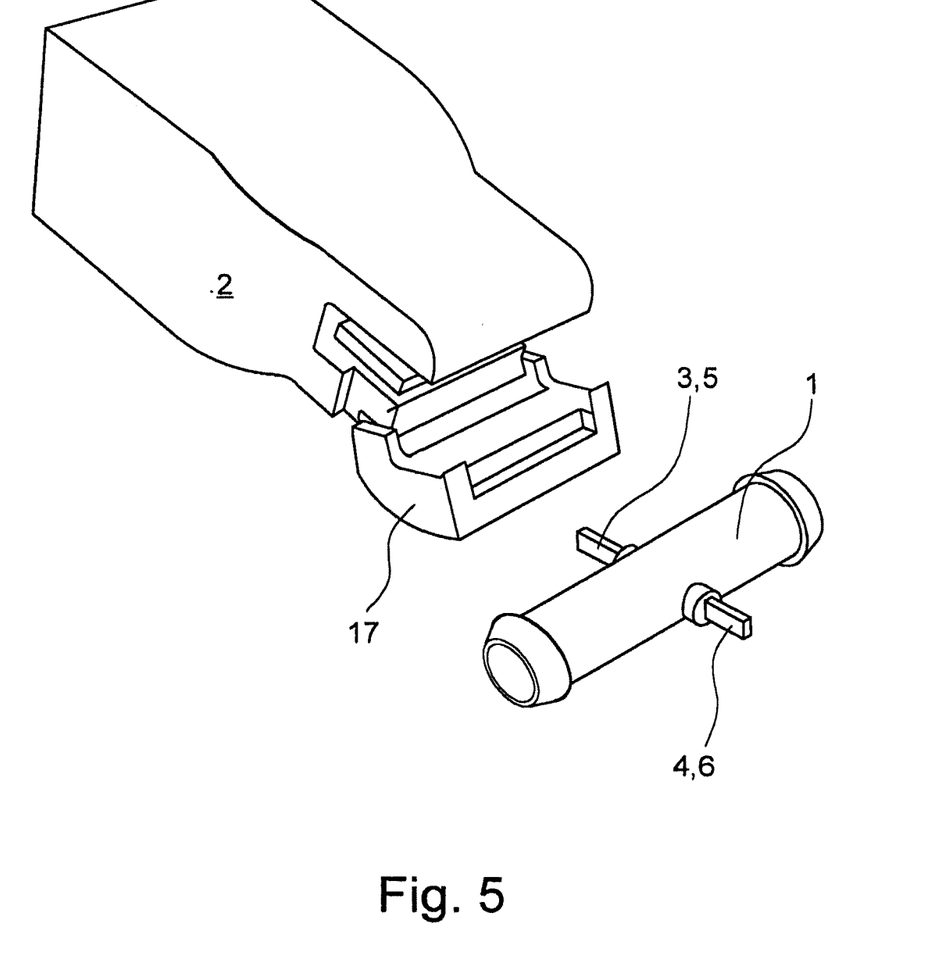
FIG. 5 is another embodiment of a magneto-inductive flow-measuring system according to the invention.

Initially and essentially, a measuring tube 1 for the flow of an electrically conductive medium and a magnetic field generator 2 for generating a, preferably alternating, magnetic field running at least also perpendicular to the longitudinal axis of the measuring tube 1 and two measuring electrodes 3, 4 preferably in contact with the medium, tapping measuring voltage induced in the electro-conductive medium belong to the magneto-inductive flow-measuring system only schematically shown in FIGS. 1, 4 and 5, wherein the measuring electrodes 3, 4 have measuring contacts 5, 6 accessible on the outside of the measuring tube 1. An evaluation unit and a measuring system housing are basically also part of the magneto-inductive flow-measuring system according to the invention. The (not shown) evaluation unit can be a part of a magneto-inductive flow-measuring system according to the invention, the evaluation unit can, however, also be implemented as a separate component. The measuring tube 1 with the measuring electrodes 3, 4 form a first functional unit and counter contacts 7, 8 corresponding to the measuring contacts 5, 6 of the measuring electrodes 3, 4, the magnetic field generator 2 and the evaluation unit (insofar as such is present) form a second functional unit. The counter contacts 7, 8, the magnetic field generator 2 and the evaluation unit (insofar as such is present) are provided in the (not shown) measuring system housing.

In the magneto-inductive flow-measuring system schematically shown in FIG. 1, a magnetic field coil 9, which has a coil core not shown in detail, belongs to the magnetic field generator 2. Pole shoes 10, 11 are adjacent to the (not shown) coil core on both sides. The (not shown) coil core and the pole shoes 10, 11 usually consist of magnetic, conductive material and, as indicated in FIG. 1, the pole shoes 10, 11 extend beyond the measuring tube 1 on both sides.

As described further above, two different embodiments are possible for the magneto-inductive flow-measuring system, namely a first embodiment in which the two above-described functional units are separate components, which result in a functional magneto-inductive flow-measuring system first when they are brought into function with one another and a second embodiment, in which both above-described functional units are already brought into function with one another in-factory, i.e., components brought into function with one another in-factory of an already functional magneto-inductive flowmeter. Only the first embodiment is described in the following. However, the following description can be applied to the second embodiment.

First, it holds true for the magneto-inductive flow-measuring system according to the invention that the measuring contacts 5, 6 of the measuring electrodes 3, 4 are provided on the measuring tube 1 in such a manner and the counter contacts 7, 8 corresponding to the measuring contacts 5, 6 of the measuring electrodes 3, 4 are arranged in the measuring system housing in such a manner that the measuring contacts 5, 6 can be brought into electrical contact with the counter contacts 7, 8 by means of an essentially translational movement essentially perpendicular to the direction of the magnetic field. This can be implemented in detail in various ways.

Figure 2:
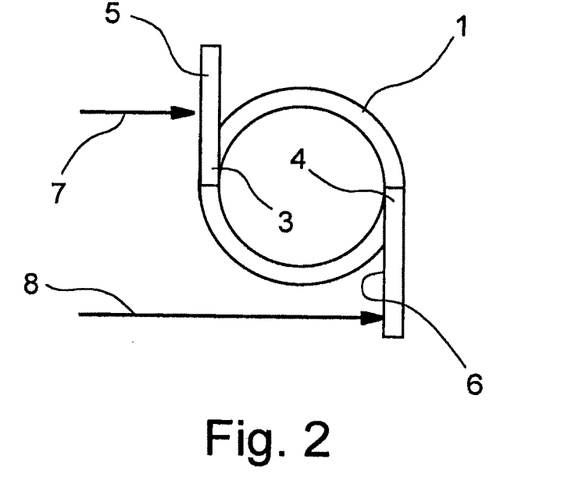
FIG. 2 is very schematic representation for describing one teaching essential for the invention, FIG. 3 similar to FIG. 2, showing a very schematic representation for describing a further teaching essential for the invention.
Figure 3:
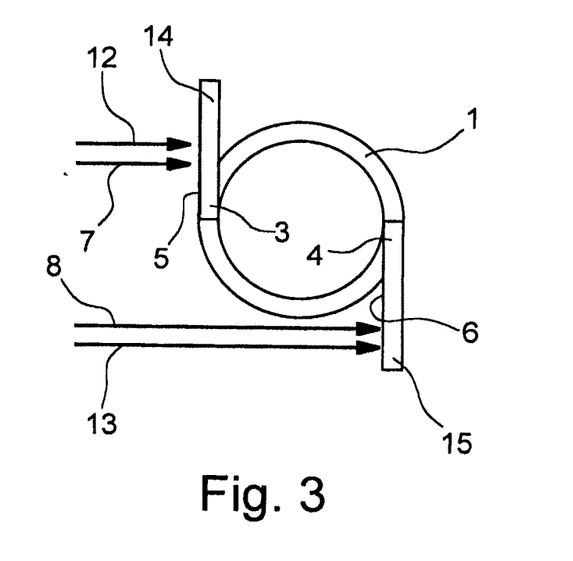

A first implementation possibility is indicated in FIGS. 2 and 3. Thereby, the measuring contact 6 of the measuring electrode 4 provided on the side of the measuring tube 1 facing away from the magnetic field coil 9 is extended at least on one side parallel to the direction of the magnetic field and the counter contact 8 assigned to the above-described measuring contact 6 is extended until it comes into contact with the corresponding measuring contact 6. Another, not shown, implementation possibility is characterized in that the measuring contact 6 of the measuring electrode 4 provided on the side of the measuring tube 1 facing away from the magnetic field coil 9 is extended at least on one side in the peripheral direction of the measuring tube and the counter contact assigned to the measuring contact described above is extended until it comes into contact with the corresponding measuring contact.

The measuring tube in magneto-inductive flow-measuring systems often has at least one preferably circular ground electrode. In such an embodiment, the ground electrode can form one of the two measuring electrodes.

FIG. 3 serves to describe a further teaching of the invention, which is of particular importance in conjunction with the above-described teachings of the invention, but also disassociated therefrom. Thereby, it is namely provided that each of the two counter contacts 7, 8 is assigned a test contact 12, 13 and that the two test contacts 12, 13, on the one hand, and the two measuring contacts 5, 6, on the other hand are designed and arranged in such a manner that the test contacts 12, 13 have electro-conductive contact to the assigned counter contacts 7, 8 when and only when the counter contact 7, 8 also has electro-conductive contact to the assigned measuring contacts 5, 6. Thereby, the test contacts 12, 13 are assigned a test counter contact 14, 15 galvanically connected to the assigned measuring contacts 5, 6. This can be implemented in a simple manner in that each of the two test counter contacts 14, 15 and the respective assigned measuring contact 5, 6 are integrally formed, i.e., as one piece.

In a preferred embodiment of the last-described magneto-inductive flowmeter, which, however, is not shown, at least one test voltage source and at least one contact indicator, for example a light diode, are provided and the test voltage source, the test contacts, the test counter contacts, the assigned measuring contacts, the assigned counter contacts and the contact indicator form a test circuit. The contact indicator is only active, i.e., a light diode provided as contact indicator is only lit, when the test circuit is closed, when, in particular, the counter contacts have electro-conductive contact with the assigned measuring contacts—testing and verifying this, being the intent and purpose of the test circuit.

It is, namely, easily possible to provide only one test circuit, i.e., one test circuit that tests if each of the two counter contacts 7, 8 has electro-conductive contact with each of the two assigned measuring contacts 5, 6. However, it is practical to provide not only one test circuit, but two test circuits so that it can be recognized using both provided contact indicators if a counter contact does not have electro-conductive contact with the assigned measuring contact, namely, which counter contact does not have electro-conductive contact with the assigned measuring contact, or if both counter contacts do not have electro-conductive contact with the assigned measuring contacts.

As described further above, magneto-inductive flow-measuring systems having measuring tubes with differing flow cross-sections, i.e., with different inner diameters are often required. In this context, a further teaching of the invention, which is of particular importance in conjunction with the above-described teaching of the invention, but also disassociated therefrom, is based on implementing a magneto-inductive flow-measuring system with measuring tubes 1 having differing flow cross-sections, i.e., differing inner diameters being readily insertable or being able to be inserted.

This is then possible when the differing insertable or inserted measuring tubes 1, each of which has the same outer diameter and the same measuring contacts 5, 6, i.e., the measuring tubes differ only in respect to the flow cross-sections, which means only the inner diameters are different.

Another implementation of easily insertable measuring tubes 1 with differing flow cross-sections, i.e., with differing inner diameters, is characterized in that the differing insertable or inserted measuring tubes 1 each have the same or equivalent measuring contacts 5, 6. Thus, it is sufficient when the measuring tubes 1, regardless of flow cross-section, i.e., independent of the inner diameter, are the same or at least functionally the same there, where the measuring contacts 5,6 are brought into electrically conductive contact with the corresponding counter contacts 7, 8.

In magneto-inductive flow-measuring systems, the user can take into consideration the use of measuring tubes with differing flow cross-sections, i.e., with differing inner diameters, namely, he can enter the flow cross-section, i.e., the inner diameter of the insertable or inserted measuring tube, into the evaluation unit, which can be a part of a magneto-inductive flow-measuring system according to the invention, but can also be implemented separate from such a magneto-inductive flow-measuring system. However, this is complex, and, in particular can lead to erroneous input. Consequently, a particularly preferred embodiment of the last-described magneto-inductive flow-measuring system is characterized in that each measuring tube is provided with an inner diameter revealing member and inner diameter query member assigned to the inner diameter revealing member of the measuring tube in the measuring system housing, an embodiment that is not shown, but easily understandable on its own.

Magneto-inductive flow-measuring systems, namely magneto-inductive flowmeters, i.e., magneto-inductive flow-measuring systems in which the two functional units are already brought into function with one another in-factory, are normally calibrated in-factory. This is practically not possible for magneto-inductive flow-measuring systems, in which both functional units, i.e., the measuring tube, on the one hand, and the magnetic field generator, on the other hand, are separate components that first result in a functional magneto-inductive flow-measuring system when they are brought together in function, in particular, this is then not possible when the measuring tubes are such that they need to be sterilized before use and must remain sterile. Taking this into consideration, a particularly preferred embodiment of a magneto-inductive flow-measuring system is characterized in that a general in-factory calibration is sufficient, i.e., an application-specific calibration for the use of measuring tubes with different flow cross-sections, i.e., with different inner diameters, is not necessary. This can only be achieved or is only achieved, when particular measures are implemented.

Initially, it must be ensured that the magnetic field generator 2 generates a homogenous magnetic field sufficient for all insertable measuring tubes 1. In particular, it must be ensured that the magnetic field generated by the magnetic field generator 2 is definitely homogenous over the entire inner diameter of the used measuring tubes 1.

For a magneto-inductive flow-measuring system in which at least one magnetic field coil 9 with at least one coil core and two pole shoes 10, 11 adjacent to both sides of the coil core belong to the magnetic field generator 2, the pole shoes 10, 11 should thus extend beyond the inserted measuring tube 1. In detail, the pole shoes 10, 11 should extend beyond the inserted measuring tube 1 at a measure that corresponds to the inner diameter of the measuring tube 1 having the largest inner diameter.

If a magneto-inductive flow-measuring system is to be implemented in which a general in-factory calibration is sufficient, i.e., an application-specific calibration for the use of measuring tubes 1 with different flow cross-sections, i.e., with different inner diameters, is not necessary, it is important to maintain certain tolerances. Thus, only measuring tubes 1 whose percentage diameter tolerance is less than half the desired percentage accuracy should be inserted and the measuring tubes with a percentage position tolerance corresponding to one quarter of the desired percentage accuracy can be attached or should be attached in the measuring system housing. In conjunction with the predetermined position tolerance, it can be of importance that (not shown) the measuring tube, on the one hand, and the measuring system housing, on the other hand, have horizontal and/or vertical attachment elements corresponding to one another to ensure the desired position tolerance.

It is valid for the embodiment of the magneto-inductive flow-measuring system according to the invention that, shown only schematically in FIGS. 4 and 5 with the help of a lid 16 (FIG. 4) that can be tilted upward or with the help of a flap 17 that can swing forward, the magneto-inductive flow-measuring system can be opened in such a manner that the measuring tube 1 to be used can be easily inserted with its measuring electrodes 3, 4 and the assigned measuring contacts 5, 6.

Embodiments of magneto-inductive flow-measuring systems that do not have movable parts like the lid 16 in the embodiment in FIG. 4 or the flap 17 in the embodiment in FIG. 5 are preferred over the embodiments shown in FIGS. 4 and 5.

What is claimed is:

1. A magneto-inductive flow-measuring system, comprising:
   a measuring tube for the flow of an electrically conductive medium,
   a magnetic field generator for generating a magnetic field running at least perpendicular to a longitudinal axis of the measuring tube, at least two measuring electrodes tapping a measuring voltage induced in the electrically conductive medium, wherein the measuring electrodes have accessible measuring contacts on an outer side of the measuring tube, wherein the measuring tube with the measuring electrodes form a first functional unit, wherein counter contacts corresponding to the measuring contacts of the measuring electrodes and the magnetic field generator form a second functional unit, wherein the counter contacts and the magnetic field generator are provided in a measuring system housing, wherein each of the counter contacts is assigned a test contact, and wherein the test contacts, on the one hand, and the measuring contacts, on the other hand, are configured and arranged in such a manner that the test contacts are in electro-conductive contact with the corresponding counter contacts only when the counter contact is in electro-conductive contact with the corresponding measuring contact, and wherein the test contacts are connected to an indicator for only providing an indication of when the counter contacts have electro-conductive contact with the assigned measuring contacts.

2. The magneto-inductive flow-measuring system according to claim 1, wherein each of the test contacts is assigned to a test counter contact that is galvanically connected to the assigned measuring contact.

3. The magneto-inductive flow-measuring system according to claim 2, wherein each of the test contacts and the assigned measuring contact are integrally formed as one piece.

4. The magneto-inductive flow-measuring system according to claim 1, wherein at least one test voltage source and at least one contact indicator are provided, and wherein the test voltage source, the test contacts, the test counter contacts, the assigned measuring contacts, the assigned counter contacts and the contact indicator form a test circuit.

5. A magneto-inductive flow-measuring system, comprising:

a measuring tube for the flow of an electrically conductive medium, a magnetic field generator for generating a magnetic field running at least perpendicular to a longitudinal axis of the measuring tube, at least two measuring electrodes tapping a measuring voltage induced in the electrically conductive medium, wherein the measuring electrodes have accessible measuring contacts on an outer side of the measuring tube, wherein the measuring tube with the measuring electrodes form a first functional unit, wherein counter contacts corresponding to the measuring contacts of the measuring electrodes and the magnetic field generator form a second functional unit, wherein the counter contacts and the magnetic field generator are provided in a measuring system housing, and wherein measuring tubes having different flow cross-sections, wherein each measuring tube is provided with an inner diameter revealing member and inner diameter query member assigned to the inner diameter revealing member of the measuring tube in the measuring system housing for enabling the effective flow cross section to be automatically taken into consideration for flow measurment when measuring tubes are inserted into the housing.

6. The magneto-inductive flow-measuring system according to claim 5, wherein each of the measuring tubes has measuring contacts with the same outer diameter.

7. The magneto-inductive flow-measuring system according to claim 5, wherein each of the measuring tubes has the same or corresponding measuring contacts.

8. A magneto-inductive flow-measuring system, comprising:

a measuring tube for the flow of an electrically conductive medium, a magnetic field generator for generating a magnetic field running at least perpendicular to a longitudinal axis of the measuring tube, at least two measuring electrodes tapping a measuring voltage induced in the electrically conductive medium, wherein the measuring electrodes have accessible measuring contacts on an outer side of the measuring tube, wherein the measuring tube with the measuring electrodes form a first functional unit, wherein counter contacts corresponding to the measuring contacts of the measuring electrodes and the magnetic field generator form a second functional unit, wherein the counter contacts and the magnetic field generator are provided in a measuring system housing, and wherein the second functional unit enables a general in-factory calibration thereof to be sufficient to eliminate the need for an application-specific calibration for use of measuring tubes with different flow cross-sections.

9. The agneto-inductive flow-measuring system according to claim 8, wherein the magnetic field generator is adapted to generate a homogenous magnetic field sufficient for all of the measuring tubes.

10. The magneto-inductive flow-measuring system according to claim 9, wherein at least one magnetic field coil is provide, the at least one magnetic field coil comprising a coil core and two adjacent pole shoes on both sides of the coil core, and wherein the pole shoes extend beyond the measuring tube on both sides thereof.

11. The magneto-inductive flow-measuring system according to claim 10, wherein the pole shoes extend beyond the measuring tube by an amount that corresponds to the outer diameter of a one of the measuring tubes that has a largest outer diameter.

12. The magneto-inductive flow-measuring system according to claim 9, wherein the measuring tubes have a percentage diameter tolerance that is less than half of a desired percentage accuracy.

13. The magneto-inductive flow-measuring system according to claim 9, wherein the measuring tubes are attached in the measuring system housing with a percentage position tolerance that corresponds to one quarter of a desired percentage accuracy.

14. The magneto-inductive flow-measuring system according to claim 4, wherein the measuring tube, on the one hand, and the measuring system housing, on the other hand, have at least one horizontal and vertical attachment elements that ensure a desired position tolerance.

\* \* \* \* \*